United States Patent
Tanuma

(10) Patent No.: US 10,719,182 B2
(45) Date of Patent: Jul. 21, 2020

(54) TOUCH SENSOR DEVICE AND CAPACITANCE CALIBRATION METHOD

(71) Applicant: KABUSHIKI KAISHA TOKAI RIKA DENKI SEISAKUSHO, Aichi (JP)

(72) Inventor: Kazuhiro Tanuma, Aichi (JP)

(73) Assignee: KABUSHIKI KAISHA TOKAI RIKA DENKI SEISAKUSHO (JP)

( * ) Notice: Subject to any disclaimer, the term of this patent is extended or adjusted under 35 U.S.C. 154(b) by 0 days.

(21) Appl. No.: 16/282,984

(22) Filed: Feb. 22, 2019

(65) Prior Publication Data

US 2019/0265813 A1 Aug. 29, 2019

(30) Foreign Application Priority Data

Feb. 27, 2018 (JP) ................................. 2018-033765

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
None
See application file for complete search history.

(56) References Cited

U.S. PATENT DOCUMENTS

| 2012/0218222 A1* | 8/2012 | Shen ..................... G06F 3/0418 345/174 |
| 2013/0106779 A1* | 5/2013 | Company Bosch .. G06F 3/0418 345/174 |

FOREIGN PATENT DOCUMENTS

JP          2010-257046 A     11/2010

* cited by examiner

*Primary Examiner* — Adam R. Giesy
(74) *Attorney, Agent, or Firm* — Tarolli, Sundheim, Covell & Tummino LLP

(57) ABSTRACT

A touch sensor device includes a touch determination processor, a calibration processor, a delay processor, and a residual capacitance determination unit. The touch determination processor determines whether a touchscreen is in a touched state or a non-touched state based on capacitance detected by each of capacitance sensors. The delay processor has the calibration processor delay calibration of the capacitance over a specified period from when determined that the touchscreen is in the non-touched state. The residual capacitance determination unit monitors the capacitance while delaying and after delaying the calibration and determines whether a residual capacitance in the non-touched state resulted from a parasitic capacitance or a touch capacitance. The calibration processor calibrates the capacitance when the residual capacitance determination unit determines that the residual capacitance resulted from the parasitic capacitance.

6 Claims, 3 Drawing Sheets

US 10,719,182 B2

TOUCH SENSOR DEVICE AND CAPACITANCE CALIBRATION METHOD

CROSS-REFERENCE TO RELATED APPLICATIONS

This application is based upon and claims the benefit of priority from prior Japanese Patent Application No. 2018-033765, filed on Feb. 27, 2018, the entire contents of which are incorporated herein by reference.

FIELD

The following description relates to a touch sensor device that detects a touch operation performed by a user and a method for calibrating capacitance.

DESCRIPTION OF RELATED ART

A capacitive touch sensor device detects a touch operation based on a change in capacitance. In principle, the capacitive touch sensor device cannot distinguish whether the change in capacitance occurs because of a touch operation performed by a user or because of parasitic capacitance resulting from a change or the like in the humidity or temperature. Accordingly, the conventional touch sensor device is configured to detect capacitance in a non-touched state and assume that the capacitance detected in the non-touched state is parasitic capacitance. The parasitic capacitance is then used to offset the detected capacitance (refer to Japanese Laid-Open Patent Publication No. 2010-257046).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

With a capacitive touch sensor device, when parasitic capacitance is generated in a touched state, the parasitic capacitance remains after the touched state is shifted to a non-touched state. Residual capacitance resulted from the parasitic capacitance will affect changes in capacitance generated by touch operations and cause erroneous touch determination. Accordingly, when a present capacitance that is detected subsequent to a touch operation is greater than a preceding capacitance detected prior to the touch operation, the capacitance may be calibrated by subtracting the preceding capacitance from the present capacitance. However, residual capacitance may have resulted from an incomplete touch performed subsequent to the touch operation. An incomplete touch is, for example, a state in which the touchscreen remains slightly touched by a finger or the like after the touch operation, or a state in which the finger or the like is not sufficiently separated from the touchscreen after the touch operation. If the capacitance calibration described above is performed in such states, the capacitance that is not parasitic capacitance will be subtracted. This lowers touch sensitivity and deteriorates the accuracy of touch determination.

In one general aspect, a touch sensor device includes a plurality of capacitance sensors arranged on a touchscreen, a touch determination processor, a calibration processor, a delay processor, and a residual capacitance determination unit. The touch determination processor determines whether the touchscreen is in a touched state or a non-touched state based on capacitance detected by each of the capacitance sensors. The calibration processor calibrates the capacitance. The delay processor has the calibration processor delay calibration of the capacitance over a specified period from when determined that the touchscreen is in the non-touched state. The residual capacitance determination unit monitors the capacitance while delaying and after delaying the calibration and determines whether a residual capacitance in the non-touched state resulted from a parasitic capacitance or a touch capacitance. The calibration processor calibrates the capacitance when the residual capacitance determination unit determines that the residual capacitance resulted from the parasitic capacitance.

In another general aspect, a method for calibrating capacitance of each of a plurality of capacitance sensors arranged on a touch sensor device includes determining whether a touchscreen is in a touched state or a non-touched state based on the capacitance detected by each of the capacitance sensors, delaying calibration of the capacitance over a specified period after determining that the touchscreen is in the non-touched state, determining whether a residual capacitance in the non-touched state resulted from a parasitic capacitance or a touch capacitance by monitoring the capacitance while delaying and after delaying the calibration over the specified period, and calibrating the capacitance when determining that the residual capacitance resulted from the parasitic capacitance.

In another general aspect, a non-transitory machine readable memory medium stores one or more programs that are executed by one or more processors. The one or more programs include instructions causing the one or more processors to execute the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An embodiment of a touch sensor device and a method for calibrating capacitance will now be described with reference to FIGS. 1 to 6.

Figure 1:
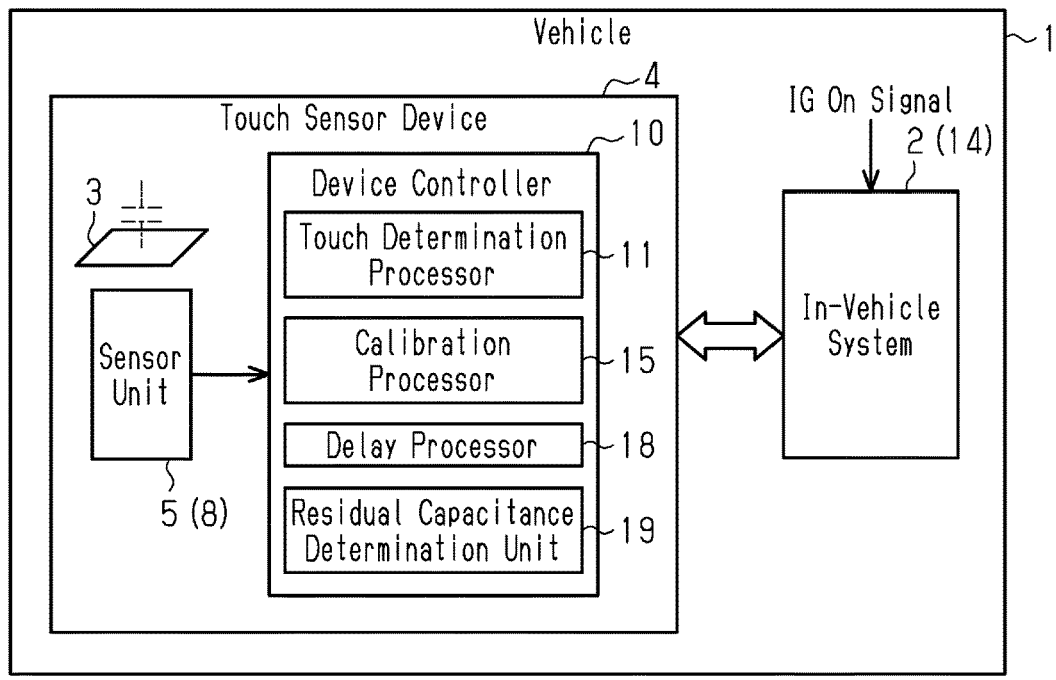
FIG. 1 is a schematic block diagram showing the configuration of a touch sensor device in accordance with one embodiment.

As illustrated in FIG. 1, a vehicle 1 includes an in-vehicle system 2 and a touch sensor device 4. The touch sensor device 4 includes a touchscreen 3 and detects when a user touches the touchscreen 3 (that is, touch operation of user). For example, when a user touch is detected after the electric power supply of the vehicle 1 is activated (for example, ignition (IG) is turned on), the in-vehicle system 2 permits driving of the vehicle 1. The touch sensor device 4 is a capacitive touch sensor device that detects when the user touches the touchscreen 3 based on changes in the capacitance. The touch sensor device 4, which includes a sensor unit 5, obtains the capacitance detected by the sensor unit 5 as a detected capacitance C(t). For example, the touch sensor device 4 compares the detected capacitance C(t) with a touch determination threshold value Cth(touch) to determine whether the user touched the touchscreen 3. The touchscreen 3 may be arranged on, for example, a steering wheel or an armrest of the vehicle 1.

The sensor unit 5 includes a plurality of capacitance sensors 8. The capacitance sensors 8 are arranged over the entire back surface of the touchscreen 3 to detect changes in capacitance that is in accordance with a user touch (touched location and touching strength) on the touchscreen 3.

The touch sensor device 4 includes a device controller 10 that controls operation of the touch sensor device 4. The device controller 10 includes a touch determination processor 11 that receives the detected capacitance C(t) from the capacitance sensors 8. The touch determination processor 11 determines a state of a user touch based on the detected capacitance C(t). In the present example, the touch determination processor 11 determines that the touchscreen 3 is in a touched state when the detected capacitance C(t) is greater than or equal to the touch determination threshold value Cth(touch). The touch determination processor 11 determines that the touchscreen 3 is in a non-touched state when the detected capacitance C(t) is less than or equal to a non-touched determination threshold value Cth(leave). Further, the touch determination processor 11 determines the location on the touchscreen 3 touched by the user based on the detected capacitance C(t).

Figure 2:
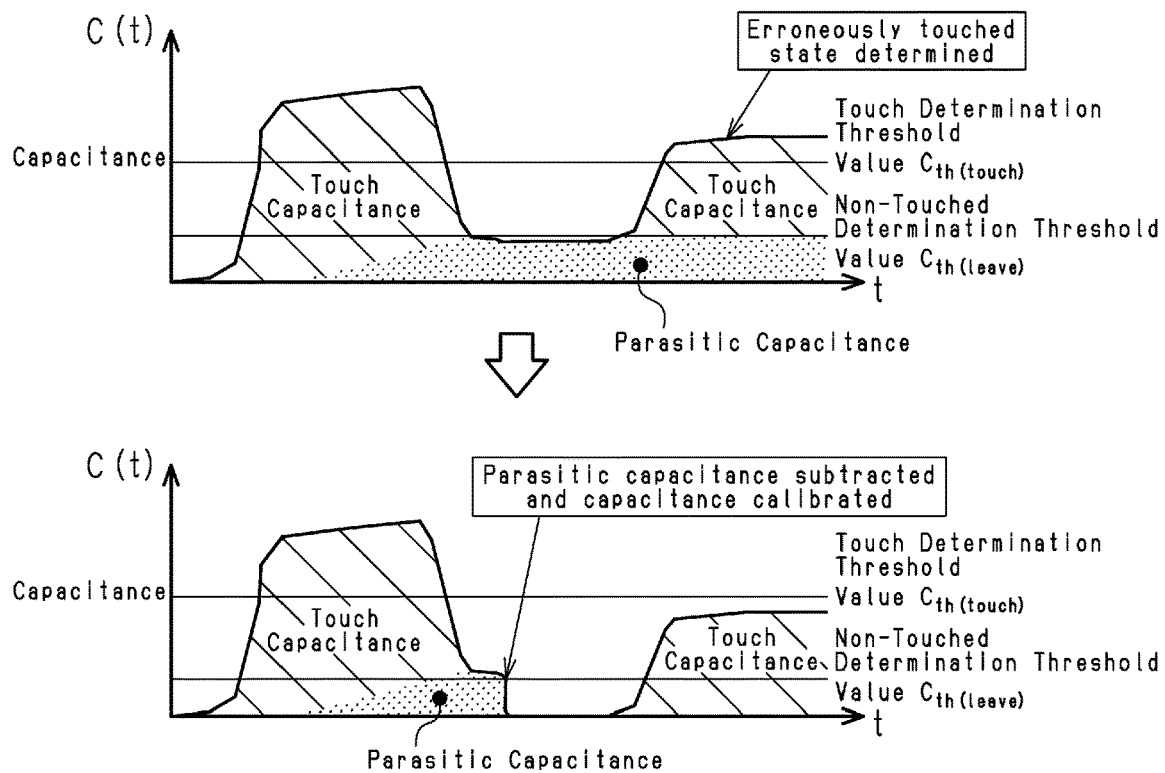
FIG. 2 is a diagram showing changes in capacitance when residual capacitance is a result of parasitic capacitance (upper graph) and changes in capacitance when capacitance is calibrated accurately (lower graph).

As illustrated in FIG. 2 (upper graph), each capacitance sensor 8 of the touch sensor device 4 includes parasitic capacitance. The value of the parasitic capacitance varies, for example, depending on changes or the like in the humidity or temperature. The parasitic capacitance needs to be taken into consideration for accurate determination of a user touch based on the detected capacitance C(t) of the capacitance sensors 8. When parasitic capacitance is generated, the parasitic capacitance is added to the capacitance generated by a user touch (hereafter, also referred to as touch capacitance). This increases the change in the detected capacitance C(t) and increases the sensitivity of touch determination in an undesirable manner. In this case, even if a touch is, for example, incomplete, the detected capacitance C(t) will be greater than or equal to the touch determination threshold value Cth(touch) and result in an erroneous determination that the user touched the touchscreen 3.

With reference to FIG. 1, the device controller 10 includes a calibration processor 15 that calibrates the detected capacitance C(t) of each capacitance sensor 8. For example, as illustrated by the upper graph in FIG. 2, when the detected capacitance C(t) decreases and becomes less than or equal to the non-touched determination threshold value Cth(leave), the touched state is shifted to a non-touched state. The calibration processor 15 compares a present detected capacitance C(t) in the non-touched state subsequent to a user touch with a preceding detected capacitance C(t) in the non-touched state prior to the user touch. When the present detected capacitance C(t) is greater than the preceding detected capacitance C(t), the calibration processor 15 determines that the capacitance difference is parasitic capacitance and subtracts the value of the capacitance difference from the detected capacitance C(t) (refer to lower graph in FIG. 2). Accordingly, the parasitic capacitance is offset from the detected capacitance C(t) so that the offset detected capacitance C(t) allows for accurate touch operation determination.

Figure 3:
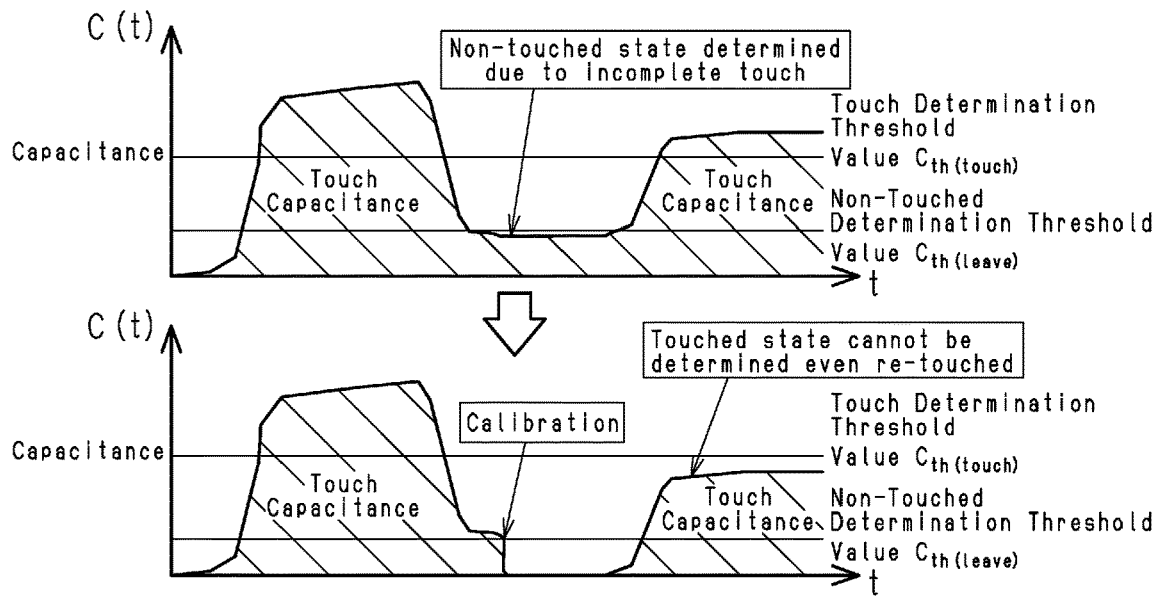
FIG. 3 is a diagram showing changes in capacitance when residual capacitance is a result of an incomplete touch (upper graph) and changes in capacitance when capacitance is calibrated erroneously (lower graph).

As illustrated by the upper graph in FIG. 3, in addition to parasitic capacitance, an incomplete touch in a non-touched state may also generate residual capacitance. In this case, if the residual capacitance is subtracted from the detected capacitance C(t), this will lower the sensitivity of touch determination for touch operations in an undesirable manner and thereby deteriorate the accuracy of touch determination. An incomplete touch may occur, for example, when intermittent touch operations are quickly repeated. For example, when intermittent touch operations are performed, capacitance will slightly remain after shifting from a touched state to a non-touched state because of part of the human body (finger or the like) that is not sufficiently separated from the touchscreen 3. Accordingly, the touch sensitivity of touch operations decreases if the residual capacitance in a non-touched state resulted from an incomplete touch and the detected capacitance C(t) is calibrated when the non-touched state is determined (refer to lower graph in FIG. 3). As a result, even when a touch operation is performed properly, the touch capacitance may not exceed the touch determination threshold value Cth(touch) and the touched state may not be determined.

With reference to FIG. 1, the touch sensor device 4 includes a delay processor 18 that has the calibration processor 15 delay calibration of the detected capacitance C(t) over a specified period Tdelay after the touchscreen 3 is determined to be in a non-touched state. The delay processor 18 is arranged, for example, in the device controller 10. For example, when the detected capacitance C(t) decreases and becomes less than or equal to the non-touched determination threshold value Cth(leave) at time $t_1$, the delay processor 18 has the calibration processor 15 delay calibration of the detected capacitance C(t) from time $t_1$ until the specified period Tdelay elapses. The specified period Tdelay is set to a duration required to determine that a user has performed successive intermittent touch operations. This duration (Tdelay) may be set to any value in accordance with a non-touched period that is permissible as an interval between the intermittent touch operations. For example, when the capacitance sensors 8 are applied to a steering wheel grip sensor, a user would not let go of the steering wheel for a long period while driving the vehicle. Thus, an incomplete touch is estimated not to continue for five seconds or longer. In this case, Tdelay may be set to five seconds.

The touch sensor device 4 includes a residual capacitance determination unit 19 that determines whether the residual capacitance in a non-touched state is a result of parasitic capacitance or touch capacitance. The residual capacitance determination unit 19 is arranged, for example, in the device controller 10. The residual capacitance determination unit 19 monitors the detected capacitance C(t) (for example, differential capacitance ΔC(t)) while and after delaying calibration to determine whether the residual capacitance in a non-touched state resulted from parasitic capacitance or touch capacitance. For example, while delaying calibration over the specified period Tdelay from the determination of a non-touched state to elapse, the residual capacitance determination unit 19 monitors whether the residual capacitance resulted from the touch capacitance. When it is not determined that the residual capacitance resulted from the touch capacitance while delaying calibration, the residual capacitance determination unit 19 obtains the detected capacitance C(t) in the present non-touched state after delaying calibration, that is, at the point of time the specified period Tdelay elapses. Subsequently, the residual capacitance determination unit 19 compares the detected capacitance C(t) in the present non-touched state with the detected capacitance C(t) in the preceding non-touched state to determine whether the residual capacitance in the non-touched state resulted from parasitic capacitance.

Figure 5:
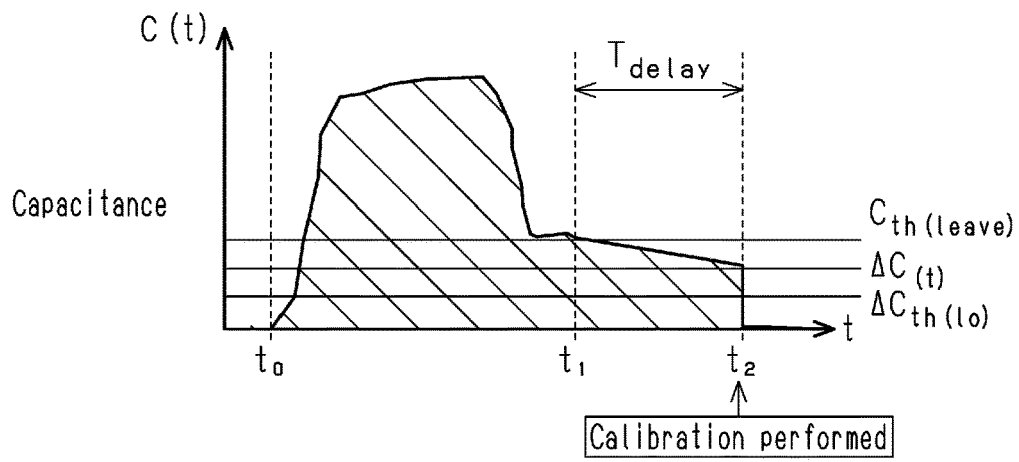
FIG. 5 is a diagram showing changes in capacitance and the calibration process when the residual capacitance is determined to have resulted from parasitic capacitance after a specified period elapses.

For example, as illustrated in FIG. 5, the residual capacitance determination unit 19 obtains the detected capacitance C($t_2$) in the present non-touched state at time $t_2$ when the specified period Tdelay elapses after the non-touched state is determined at time $t_1$. Then, the residual capacitance determination unit 19 calculates an absolute value |ΔC(t)| of a differential capacitance ΔC(t) between the detected capacitance C(t0) in the preceding non-touched state and the detected capacitance C($t_2$) in the present non-touched state. The residual capacitance determination unit 19 compares the absolute value |ΔC(t)| with a lower limit threshold value ΔCth(lo) to determine whether the residual capacitance in the non-touched state (here, ΔC(t)) resulted from parasitic capacitance. The lower limit threshold value ΔCth(lo) may be set to a value approximate to the capacitance that can be generated, for example, by a floor noise. Obtaining the absolute value of ΔC(t) allows for the calibration logic in the present example to be applied when parasitic capacitance increases during a touch operation and also when parasitic capacitance decreases during a touch operation.

The calibration processor 15 calibrates the detected capacitance C(t) when the residual capacitance determination unit 19 determines that the residual capacitance resulted from parasitic capacitance. For example, the calibration processor 15 calibrates the detected capacitance C(t) when the absolute value |ΔC(t)| of the above described differential capacitance ΔC(t) exceeds the lower limit threshold value ΔCth(lo). For example, the calibration processor 15 subtracts the differential capacitance ΔC(t) from the detected capacitance C(t) to calibrate the detected capacitance C(t).

The operation and effects of the touch sensor device 4 will now be described with reference to FIGS. 4 to 6. The flowchart in FIG. 4 illustrates the process after a touched state is determined.

Figure 4:
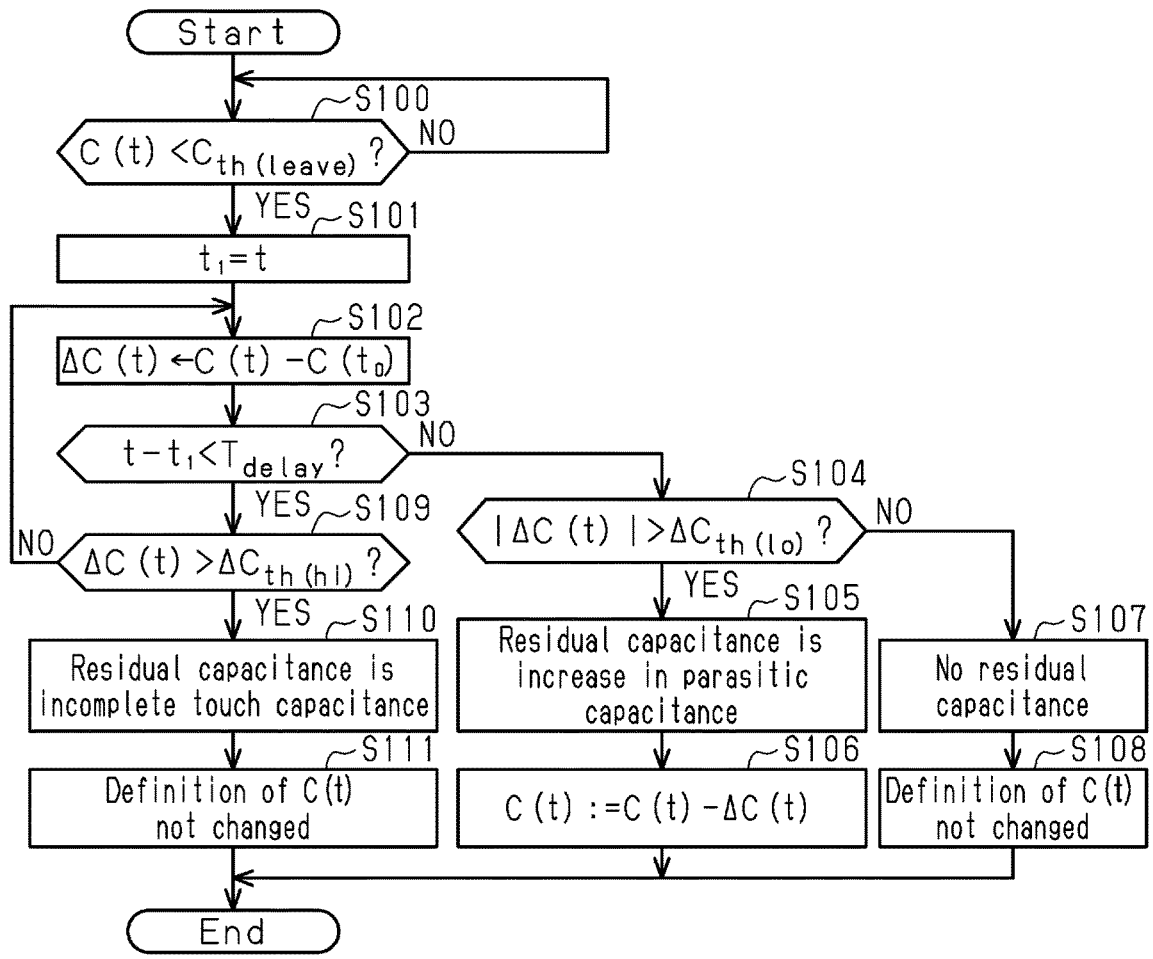
FIG. 4 is a flowchart illustrating a capacitance calibration process.

As illustrated FIG. 4, in step S100, when the touchscreen 3 is in a touched state, the touch determination processor 11 determines whether the detected capacitance C(t) decreased to a value less than the non-touched determination threshold value Cth(leave). That is, the touch determination processor 11 determines whether the touchscreen 3 is shifted from the touched state to a non-touched state. When C(t)<Cth(leave) is satisfied, the touch determination processor 11 proceeds to step S101. When C(t)<Cth(leave) is not satisfied, the touch determination processor 11 repeats step S100.

In step S101, the residual capacitance determination unit 19 sets $t_1$ to the time when the detected capacitance C(t) decreased to less than the non-touched determination threshold value Cth(leave) (refer to FIG. 5). In the description hereafter, the time when capacitance was detected in the preceding non-touched state will be referred to as time $t_0$. When the detected capacitance C(t) in the preceding non-touched state has been calibrated to zero, the detected capacitance C(t) in the preceding non-touched state can be obtained at time to that is when the capacitance increases from zero.

In step S102, the residual capacitance determination unit 19 subtracts the detected capacitance C($t_0$) in the preceding non-touched state (time $t_0$) from the detected capacitance C(t) in the present non-touched state (present time t) to obtain a present differential capacitance ΔC(t).

In step S103, the delay processor 18 determines whether the duration that is obtained by subtracting time $t_1$ from present time t is less than the specified period Tdelay, while delaying calibration of the detected capacitance C(t). That is, the delay processor 18 determines whether (t−$t_1$)<Tdelay is satisfied. When (t−$t_1$)<Tdelay is not satisfied (S103:NO), this indicates that the specified period Tdelay has elapsed from time $t_1$ after a non-touched state was determined. In this case, the process proceeds to step S104. When (t−$t_1$)<Tdelay is satisfied, this indicates that the specified period Tdelay did not elapse from time $t_1$. In this case, the process proceeds to step S109.

In step S104, the residual capacitance determination unit 19 determines whether the absolute value |ΔC(t)| of the capacitance difference between the present detected capacitance C(t) after the specified period Tdelay elapsed and the preceding detected capacitance C($t_0$) exceeds the lower limit threshold value ΔCth(lo). That is, the residual capacitance determination unit 19 determines whether |ΔC(t)|>ΔCth(lo) is satisfied.

As illustrated in FIG. 5, when the detected capacitance C(t) includes parasitic capacitance, the differential capacitance ΔC(t) does not become less than or equal to the lower limit threshold value ΔCth(lo) even after the specified period Tdelay has elapsed (time $t_2$) subsequent to determination of a non-touched state. In this case, the residual capacitance determination unit 19 determines that parasitic capacitance has been generated and calibrates the detected capacitance C(t). In contrast, if the differential capacitance ΔC(t) is less than or equal to the lower limit threshold value ΔCth(lo) after the specified period Tdelay has elapsed subsequent to the determination of the non-touched state, the detected capacitance C(t) is sufficiently low. Thus, the residual capacitance determination unit 19 determines that parasitic capacitance has not been generated.

With reference to FIG. 4, when $|\Delta C(t)|>\Delta Cth(lo)$ has been satisfied (step S104:YES), the process proceeds to step S105. When $|\Delta C(t)|>\Delta Cth(lo)$ is not satisfied, the process proceeds to step S107.

In step S105, the residual capacitance determination unit 19 determines that the residual capacitance (for example, differential capacitance $C(t)$ calculated at time $t_2$ in FIG. 5) is parasitic capacitance.

In step S106, the calibration processor 15 calibrates the detected capacitance $C(t)$. In the present example, the calibration processor 15 subtracts the differential capacitance $\Delta C(t)$ from the present detected capacitance $C(t)$ and calculates a new detected capacitance $C(t)$ to obtain the new detected capacitance $C(t)$ as calibrated capacitance.

In step S107, the residual capacitance determination unit 19 determines that there is no residual capacitance, that is, parasitic capacitance has not been generated.

In step S108, the calibration processor 15 does not change the definition of the present detected capacitance $C(t)$ (parasitic capacitance is not generated) and does not calibrate the detected capacitance $C(t)$.

Figure 6:
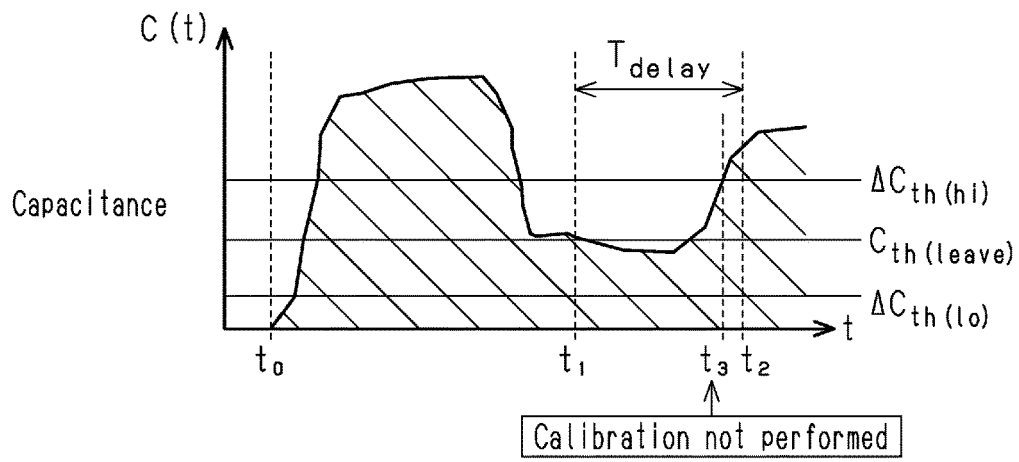
FIG. 6 is a diagram showing changes in capacitance when the residual capacitance is determined to have resulted from a touch capacitance during the specified period.

FIG. 6 illustrates changes in capacitance when intermittent touch operations are performed while the touchscreen 3 is in an incomplete touched state. As described above, the specified period Tdelay is set to a duration required to determine that a user is successively performing intermittent touch operations. Accordingly, when intermittent touch operations are performed, it is highly likely that the detected capacitance $C(t)$ will increase after determination of a non-touched state before the specified period Tdelay elapses. For example, the detected capacitance $C(t)$ exceeds a re-touch determination threshold value $\Delta Cth(hi)$ at time $t_3$ before the specified period Tdelay elapses (refer to FIG. 6). Time $t_3$ is a point in time after time $t_1$ and before time $t_2$. When $C(t_0)$ is equal to zero, the detected capacitance $C(t)$ can be obtained as the differential capacitance $\Delta C(t)$. When the differential capacitance $\Delta C(t)$ exceeds the re-touch determination threshold value $\Delta Cth(hi)$, the residual capacitance determination unit 19 determines that the incomplete touch has returned to a complete touch operation. In this case, the calibration processor 15 does not calibrate the detected capacitance $C(t)$ and maintains the present calibration.

With reference to FIG. 4, in step S109, the residual capacitance determination unit 19 determines whether the differential capacitance $\Delta C(t)$ exceeded the re-touch determination threshold value $\Delta Cth(hi)$ after time $t_1$ before the specified period Tdelay elapses. When $\Delta C(t)>\Delta Cth(hi)$ is satisfied, the process proceeds to step S110. When $\Delta C(t)>\Delta Cth(hi)$ is not satisfied, the process returns to step S102.

In step S110, the residual capacitance determination unit 19 determines that the residual capacitance in the non-touched state is capacitance generated by an incomplete touch.

In step S111, the calibration processor 15 does not change the definition of the present detected capacitance $C(t)$ (parasitic capacitance is not generated) and does not calibrate the detected capacitance $C(t)$.

The touch sensor device 4 described above includes a memory (not illustrated) that stores one or more programs including instructions to execute the calibration process illustrated in FIG. 4 with the device controller 10. For example, the device controller 10 includes one or more processors and executes the calibration process illustrated in FIG. 4 in accordance with the programs stored in the memory. Such programs may be provided as a non-transitory machine readable memory medium that stores the programs.

In the above embodiment, multiple functions of the device controller 10 are divided into function blocks of the touch determination processor 11, the calibration processor 15, the delay processor 18, and the residual capacitance determination unit 19. However, the function blocks may be divided into a larger number of function blocks. Alternatively, two or more function blocks may be merged.

The present embodiment has the advantages described below.

(1) When residual capacitance generated by an incomplete touch is present in a non-touched state, a re-touch operation (complete touch) that is performed while delaying calibration increases the detected capacitance $C(t)$. Then, if a relatively large increase in the detected capacitance $C(t)$ is detected while delaying calibration, the touch sensor device 4 determines that the residual capacitance resulted from an incomplete touch. In contrast, when the specified period Tdelay elapses without detecting a re-touch while delaying calibration, namely, after delaying calibration, the touch sensor device 4 determines whether the residual capacitance resulted from parasitic capacitance by determining whether the residual capacitance has a certain size. In this way, the touch sensor device 4 determines whether the residual capacitance resulted from parasitic capacitance or touch capacitance and performs calibration only when the residual capacitance resulted from parasitic capacitance. This improves the calibration accuracy of the detected capacitance $C(t)$.

(2) The specified period Tdelay, while which calibration is delayed, is set to a duration required to determine that a user is successively performing intermittent touch operations. Accordingly, the delay time can be set to an optimal duration.

(3) The residual capacitance determination unit 19 obtains the detected capacitance $C(t_2)$ in the present non-touched state at time $t_2$ when the specified period Tdelay has elapsed after determination of the non-touched state. Subsequently, the residual capacitance determination unit 19 compares the detected capacitance $C(t_0)$ in the preceding non-touched state with the detected capacitance $C(t_2)$ in the present non-touched state and determines from the comparison result whether the residual capacitance resulted from parasitic capacitance. This simple process of comparing two detected capacitances before and after a touch operation allows for determination of whether the residual capacitance is a result of parasitic capacitance.

(4) The residual capacitance determination unit 19 calculates the absolute value $|\Delta C(t)|$ of the differential capacitance $\Delta C(t)$ between two detected capacitances $C(t_0)$ and $C(t_2)$ before and after a touch operation and compares the absolute value $|\Delta C(t)|$ with the lower limit threshold value $\Delta Cth(lo)$ to determine whether residual capacitance is a result of parasitic capacitance. Application of the absolute value of the differential capacitance $\Delta C(t)$ allows for residual capacitance and parasitic capacitance to be distinguished from each other when parasitic capacitance increases and also when parasitic capacitance decreases.

(5) The calibration processor 15 does not calibrate the detected capacitance $C(t)$ when the residual capacitance determination unit 19 determines that residual capacitance did not result from parasitic capacitance. Accordingly, calibration is performed only when necessary thereby avoiding unnecessary calibrations. Further, this reduces erroneous calibrations.

(6) When the differential capacitance $C(t)$ exceeds the re-touch determination threshold value $\Delta Cth(hi)$ while delaying calibration over the specified period Tdelay, the calibration processor 15 determines that residual capacitance resulted from an incomplete touch and does not calibrate the detected capacitance C(t). Accordingly, the detected capacitance C(t) is not calibrated when the residual capacitance is the touch capacitance. This avoids erroneous calibrations.

It should be apparent to those skilled in the art that the foregoing embodiments may be implemented in many other specific forms without departing from the scope of this disclosure. Particularly, it should be understood that the foregoing embodiments may be implemented in the following forms.

The following modifications and the above embodiment may be combined as long as the combined modifications remain technically consistent with each other.

Figure 7:
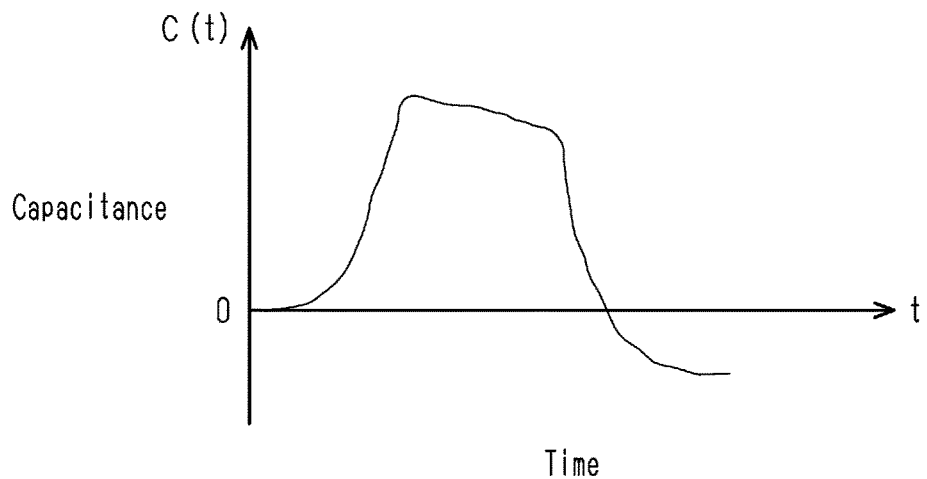
FIG. 7 is a waveform showing changes in capacitance in accordance with another example.

The logic of the recalibration of the detected capacitance C(t) may be applied to cases other than when the parasitic capacitance increases. For example, as illustrated in FIG. 7, the recalibration logic may also be applied when the parasitic capacitance decreases.

The touch determination threshold value ΔCth(touch) is set in accordance with the design and application of the touch sensor device 4. For example, the touch determination threshold value ΔCth(touch) may be set to greater than a floor noise value (capacitance generated by floor noise) and less than or equal to an estimated minimum capacitance for determination of the touched state.

The re-touch determination threshold value ΔCth(hi) is set in accordance with the design and application of the touch sensor device 4. For example, the re-touch determination threshold value ΔCth(hi) may be set to a value obtained by adding a floor noise value to the non-touched determination threshold value Cth(leave).

The touch determination threshold value Cth(touch) may be set to differ from or be equal to the threshold value that is used to determine a non-touched state (non-touched determination threshold value Cth(leave)).

The detected capacitance C(t) in the preceding non-touched state does not have to be obtained at a time when the capacitance increases from zero (to in FIG. 5). In other words, the detected capacitance does not have to be calibrated to zero in a non-touched state. The detected capacitance C(t) in the preceding non-touched state may be obtained at a time when the capacitance increases from the respective calibrated value.

When the touch sensor device 4 is activated, the capacitance generated while the touchscreen 3 is in a non-touched state may be considered as parasitic capacitance, and an initial calibration may be performed on the detected capacitance C(t) by offsetting the parasitic capacitance.

The capacitance sensors 8 do not have to increase the output value when the touchscreen 3 is touched and may decrease the output value when the touchscreen 3 is touched.

The vehicle 1 may be a self-driving vehicle.

The touch sensor device 4 may be applied to any device such as an in-vehicle touch panel.

The system 14 that uses the touch sensor device 4 is not limited to a vehicle system such as the in-vehicle system 2, and may be used in any system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

What is claimed is:

1. A touch sensor device, comprising:
   a plurality of capacitance sensors arranged on a touchscreen;
   a touch determination processor that determines whether the touchscreen is in a touched state or a non-touched state based on capacitance detected by each of the capacitance sensors;
   a calibration processor that calibrates the capacitance;
   a delay processor that delays the calibration processor over a specified period after the touch determination processor determines that the touchscreen is in the non-touched state; and
   a residual capacitance determination unit that monitors the capacitance while delaying and after delaying the calibration and determines whether a residual capacitance in the non-touched state resulted from a parasitic capacitance or a touch capacitance,
   wherein the calibration processor calibrates the capacitance when the residual capacitance determination unit determines that the residual capacitance resulted from the parasitic capacitance, and
   wherein the residual capacitance determination unit
   obtains a capacitance in a present non-touched state after the specified period elapses from when determined that the touchscreen is in the non-touched state,
   compares an absolute value of a capacitance difference between the capacitance in the present non-touched state and a capacitance in a preceding non-touched state with a lower limit threshold value, and
   determines whether the residual capacitance resulted from the parasitic capacitance based on the comparison result.

2. The touch sensor device according to claim 1, wherein the specified period is set to a duration for determination that a user is successively performing intermittent touch operations.

3. The touch sensor device according to claim 1, wherein the calibration processor does not perform calibration of the capacitance when the residual capacitance determination unit determines that the residual capacitance did not result from the parasitic capacitance.

4. The touch sensor device according to claim 1, wherein the calibration processor does not perform calibration of the capacitance when the capacitance changes to a value that exceeds a re-touch determination threshold value while delaying calibration over the specified period.

5. A method for calibrating capacitance of each of a plurality of capacitance sensors arranged on a touch sensor device, the method comprising:
   determining whether a touchscreen is in a touched state or a non-touched state based on the capacitance detected by each of the capacitance sensors;
   delaying calibration of the capacitance over a specified period after determining that the touchscreen is in the non-touched state;
   determining whether a residual capacitance in the non-touched state resulted from a parasitic capacitance or a touch capacitance by monitoring the capacitance while delaying and after delaying the calibration; and
   calibrating the capacitance when determining that the residual capacitance resulted from the parasitic capacitance, wherein the determining whether a residual capacitance in the non-touched state resulted from a parasitic capacitance or a touch capacitance includes:

obtaining a capacitance in a present non-touched state after the specified period elapses from when determined that the touchscreen is in the non-touched state;

comparing an absolute value of a capacitance difference between the capacitance in the present non-touched state and a capacitance in a preceding non-touched state with a lower limit threshold value; and determining whether the residual capacitance resulted from the parasitic capacitance based on the comparison result.

6. A non-transitory machine readable memory medium that stores one or more programs executed by one or more processors, the one or more programs comprising instructions causing the one or more processors to execute the method of claim 5.

* * * * *